United States Patent [19]

Heurtel et al.

[11] Patent Number: 5,018,941

[45] Date of Patent: May 28, 1991

[54] BLADE FIXING ARRANGEMENT FOR A TURBOMACHINE ROTOR

[75] Inventors: Bertrand J. J. M. Heurtel, Vert Saint Denis; Pierre-Louis Mondoloni, Boissy St Leger; Jacques R. Serre, Vaux le Penil, all of France

[73] Assignee: Societe Nationale d'Etude et de Construction de Moteurs d'Aviation"S.N.E.C.M.A., Paris, France

[21] Appl. No.: 460,814

[22] Filed: Jan. 4, 1990

[30] Foreign Application Priority Data

Jan. 11, 1989 [FR] France ................................. 89 00245

[51] Int. Cl.⁵ ............................................. F01D 5/30
[52] U.S. Cl. ................................ 416/220 R; 416/217; 416/500
[58] Field of Search .................... 416/204 A, 215, 217, 416/219 R, 220 R, 221, 500, 193 A

[56] References Cited

U.S. PATENT DOCUMENTS

| | | | |
|---|---|---|---|
| 2,654,565 | 10/1963 | Feilden | 416/214 R |
| 2,654,566 | 10/1953 | Boyd et al. | 415/137 |
| 3,023,998 | 3/1962 | Sanderson, Jr. | 416/220 |
| 3,063,674 | 11/1962 | Middlebrooks, Jr. | 416/220 R |
| 4,492,517 | 1/1985 | Klompas | 416/217 X |
| 4,687,413 | 8/1987 | Prario | 415/190 |
| 4,856,963 | 8/1989 | Klapproth et al. | 415/190 |

FOREIGN PATENT DOCUMENTS

| | | |
|---|---|---|
| 0077236 | 4/1983 | European Pat. Off. . |
| 0280246 | 8/1988 | European Pat. Off. . |
| 43102 | 3/1985 | Japan ........................ 416/193 A |
| 848465 | 9/1960 | United Kingdom . |
| 2001398 | 1/1979 | United Kingdom ......... 416/193 A |
| 2097480 | 11/1982 | United Kingdom . |

*Primary Examiner*—John T. Kwon
*Assistant Examiner*—James A. Larson
*Attorney, Agent, or Firm*—Oblon, Spivak, McClelland, Maier & Neustadt

[57] ABSTRACT

Each blade of a turbomachine rotor is secured to the drum of the rotor by upstream and downstream legs on the radially inner side of the blade platform cooperating with upstream and downstream annular beads on the periphery of the durm, and a locking plate holding the legs in position. The end of the upstream leg is received in an annular groove in the upstream bead, and the downstream leg has an aperture which receives a tongue projecting from a collar on the downstream bead. the downstream leg ends in a cylindrical bearing surface acting on a cylindrical bearing surface of the drum, and includes two hooks on its donwstream face. The locking plate is located in an annular groove of the drum at the downstream edge of the cylindrical bearing surface and has first tongues engaging with the hooks on the downstream leg and second locating tongues at each end.

2 Claims, 2 Drawing Sheets

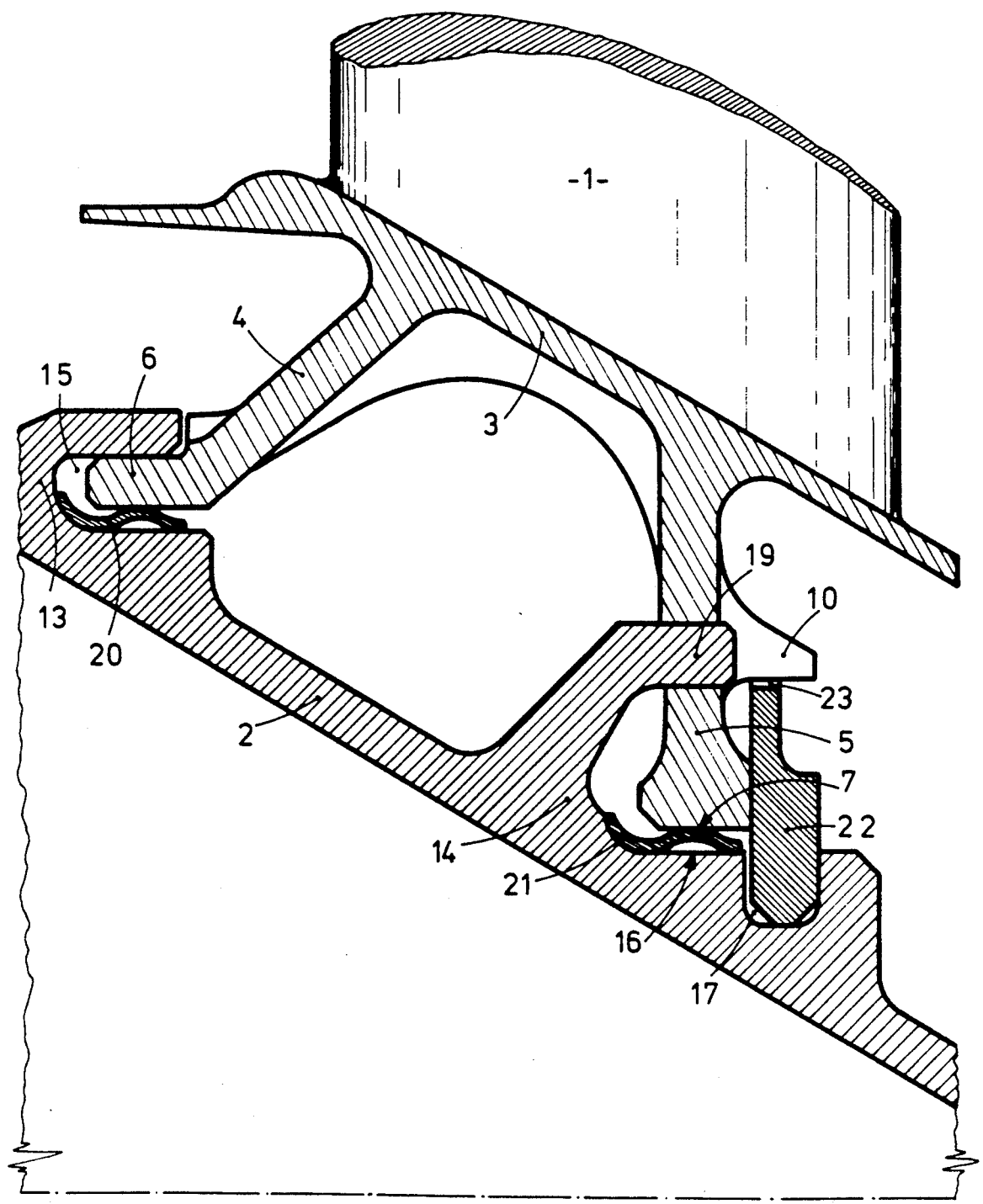
FIG: 1

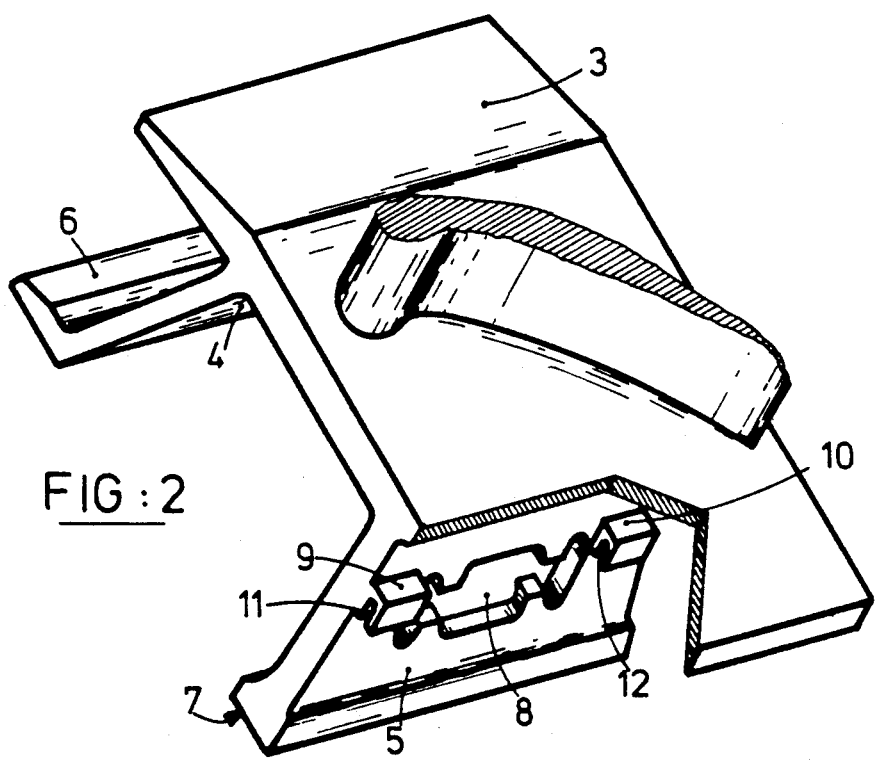
FIG:2
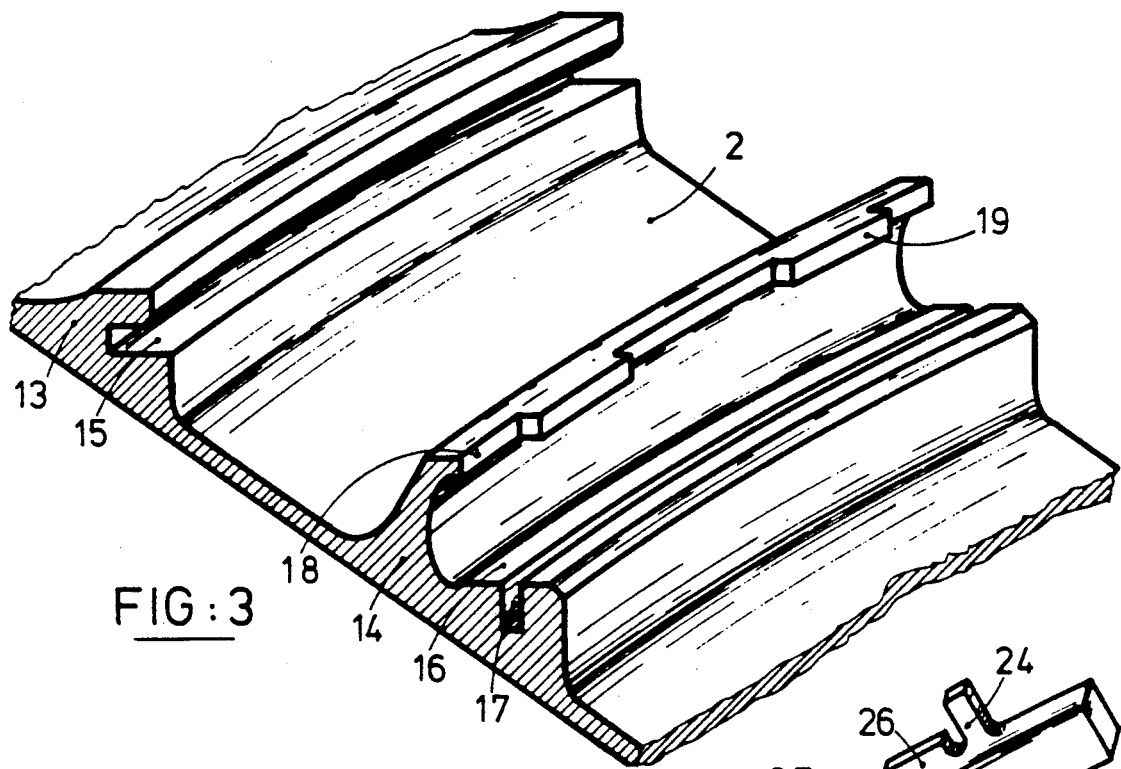
FIG:3
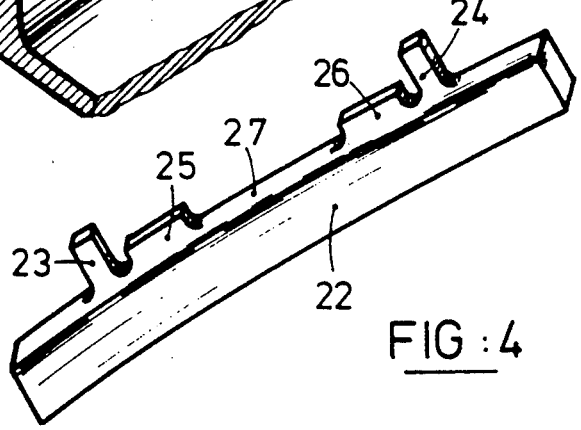
FIG:4

BLADE FIXING ARRANGEMENT FOR A TURBOMACHINE ROTOR

BACKGROUND OF THE INVENTION

1. Field of the Invention

The present invention relates to the fixing of the rotor blades to the drum of a turbomachine rotor.

2. Summary of the Prior Art

Several means are currently used for effecting the fixing and radial retention of the movable blades mounted on the wheels or rotors of modern turbomachines operating at high rotational speeds. Usually the blades, which are formed with a vane portion having an aerodynamic shape which ensures the desired performance of the compression or turbine stage for which the blade is designed, are provided with a base including a root which may be surmounted by a platform defining the inner wall of the main gas flow path. This root, which may be of hammer or fir-tree shape, is located in a cooperating axial groove provided in the rim of a wheel disc or in the outer periphery of a rotor drum. In some cases, the assembly may similarly be made in a peripheral or circumferential direction. In all cases, additional means are normally used to ensure locking of the blades in the radial, axial and peripheral directions.

These well known solutions are still widely used, particularly in aeronautical applications both in the military field and in the civil field, but are not entirely satisfactory in aircraft engines of new design, particularly those which incorporate an additional power turbine of slow rotational speed, intended to drive either a fan or a propeller, and including in particular two contra-rotating stages. As a particular consequence of the reduction of rotational speeds and therefore also of the level of stress to which the rotary parts are subjected, a lightening of the previously used technology is found to be practical. This lightness objective is accompanied by a search for simplification in order, particularly, to make assembly easier. Also, taking into account the new condition of use, the parts should exhibit good behavioural qualities at low rotational speeds of the rotor.

Some elements of a solution may be found in older arrangements which have not reached the degree of complexity and sophistication of more recent, better known solutions, and which are inadequate in themselves.

For example, U.S. Pat. No. 2,654,565 describes the mounting of blades in which the base includes shoulders forming hooks cooperating with slits provided on the rims of assembled discs to form a rotor. U.S. Pat. No. 3,063,674 illustrates the use of rivets for securing rotor blades.

SUMMARY OF THE INVENTION

With the aim of providing a satisfactory solution to the problems described above, according to the invention there is provided a turbomachine rotor comprising a drum and at least one stage of blades secured to the outer periphery of said drum, said drum having upstream and downstream annular beads on said outer periphery thereof, an annular groove in said upstream bead, an annular collar on said downstream bead, said collar being provided with peripherally spaced tongues projecting in the downstream direction, a cylindrical bearing surface on said drum adjacent said downstream bead, and an annular groove in said drum on the downstream side of said cylindrical bearing surface, said blades each having a platform provided with upstream and downstream legs on the radially inner face thereof, said upstream leg having an end edge received in said annular groove of said upstream bead on said drum, and said downstream leg having a cylindrical bearing surface at its radially inner end acting on said cylindrical bearing surface of said drum, a central aperture receiving at least one of said tongues of said collar on said downstream bead, and a pair of hooks on said downstream face of said downstream leg, each of said hooks defining a recess in its radially inner face, said rotor including a plurality of arcuate locking plates received in said annular groove of said drum and securing said blades in position, each of said locking plates having first tongues received in said recesses of said hooks on said downstream leg of a blade platform, and second locking tongues at the ends of said locking plate.

Preferably a first resilient corrugated wedge is disposed in said annular groove of said upstream bead on said drum between said end edge of said upstream leg of said blade platform and the radially inner face of said groove, and a second resilient corrugated wedge is disposed between said cylindrical bearing surfaces of said drum and said downstream leg of said blade platform.

Other features and advantages of the invention will become apparent from the following description of one embodiment of the invention, with reference to the attached drawings.

BRIEF DESCRIPTION OF THE DRAWINGS

FIG. 1 is a diagrammatic sectional view of part of a movable blade stage of one embodiment of a turbomachine rotor in accordance with the invention, taken in a plane passing through the axis of rotation of the rotor.

FIG. 2 is a diagrammatic perspective view, partly cut away, showing the platform of one of the blades of the stage shown in FIG. 1.

FIG. 3 is a diagrammatic perspective view of a portion of the rotor drum corresponding to the part which is shown in FIG. 1.

FIG. 4 is a perspective view of a locking plate which is used for locking in position the blading shown in FIG. 1.

DESCRIPTION OF THE PREFERRED EMBODIMENT

The movable blade stage of the turbomachine rotor shown in FIG. 1 comprises a plurality of blades 1 mounted in an evenly distributed manner around the outer periphery of a drum 2 and secured thereto by fixing means in accordance with the invention. The drum 2 generally comprises several such stages, but only one is shown in the drawings for purposes of simplicity and clarity.

As may be seen also in FIG. 2, each blade comprises a platform 3 having, on its radially inner face, a pair of generally radially orientated upstream and downstream legs 4,5 respectively. The upstream leg 4 has a thinned end edge 6 forming a hook. The downstream leg 5 ends at a cylindrical bearing surface 7, and includes an aperture 8 in its radial portion. In addition, the leg 5 has a hook 9,10 adjacent each edge on its downstream face, each hook defining a recess 11,12 in its radially inner face.

As will be seen in FIGS. 1 and 3 the part of the drum 2 in the region of the movable blading has two longitudinally spaced annular beads 13,14 on its outer surface. The upstream bead 13 has an annular groove 15 open in the downstream direction. The downstream bead 14 has a cylindrical bearing surface 16 at its base on the downstream side, a radially oriented annular groove 17 in the surface 16, and an annular collar 18 provided with evenly spaced tongues 19 at its outer end.

The assembly and securing of each blade 1 on the rotor drum 2 is carried out as follows. First of all, wedges in the form of resilient corrugated plates 20,21 are respectively placed on the radially inner face of the groove 15 in the upstream bead 13 of the drum 2 and on the cylindrical bearing surface 16 of the downstream bead 14. Then, simultaneously, the end edge 6 of the upstream leg 4 of the blade platform 3 is introduced into the groove 15 of the upstream bead 13 of the drum 2, and the tongues 19 of the downstream bead 14 of the drum 2 are introduced into the aperture 8 of the downstream leg 5 of the blade platform 3. On assembly, a slight pressure is exerted on the wedges 20 and 21, which serves to prevent rattling of the blades when the rotor is rotating in self-rotation at low speed. The assembly is continued by the fitting of locking plates 22 of arcuate shape such as shown in FIG. 4. Each plate 22 has on its outer edge two long tongues 23 and 24, between which there are two wider and shorter tongues 25 and 26 separated by a space 27. Before fitting, the tongue 23 is bent at a right angle to the body of the plate. The plate 22 is then introduced slantwise into the groove 17 of the drum while presenting the space 27 towards the tongue 19, following which it is straightened to bring it into contact with the downstream face of the platform leg 5. The plate 22 is then slid along the groove 17 to bring the tongues 25 and 26 into the recesses 11 and 12 of the hooks 9 and 10 on the downstream leg 5 of the blade platform. The plate 22 is pushed until the tongue 24 abuts the hook 9, and the tongue 23 is then straightened. In this way an assembled turbomachine rotor is obtained in accordance with the invention and as shown in FIG. 1.

In the arrangement described, radial locking of the blades is effected by the tongues 19 on the downstream side and the grooved bead 13 on the upstream side; axial locking of the blades is effected by the plates 22 and the upstream bead 13; and peripheral locking of the blades is effected by the tongues 23 and 24 of the plates 22.

We claim:

1. A turbomachine rotor comprising a drum and at least one stage of blades secured to the outer periphery of said drum, said drum having upstream and downstream annular beads on said outer periphery thereof, an annular groove in said upstream bead, an annular collar on said downstream bead, said collar being provided with peripherally spaced tongues projecting in the downstream direction, a cylindrical bearing surface on said drum adjacent said downstream bead, and an annular groove in said drum on the downstream side of said cylindrical bearing surface, said blades each having a platform provided with upstream and downstream legs on the radially inner face thereof, said upstream leg having an end edge received in said annular groove of said upstream bead on said drum, and said downstream leg having a cylindrical bearing surface at its radially inner end acting on said cylindrical bearing surface of said drum, a central aperture receiving at least one of said tongues of said collar on said downstream bead, and a pair of hooks on the downstream face of said downstream leg, each of said hooks defining a recess in its radially inner face, said rotor including a plurality of arcuate locking plates received in said annular groove of said drum and securing said blades in position, each of said locking plates having first tongues received in said recesses of said hooks on said downstream leg of a blade platform, and second locking tongues at the ends of said locking plate.

2. A turbomachine rotor according to claim 1, wherein a first resilient corrugated wedge is disposed in said annular groove of said upstream bead on said drum between said end edge of said upstream leg of said blade platform and the radially inner face of said groove, and a second resilient corrugated wedge is disposed between said cylindrical bearing surfaces of said drum and said downstream leg of said blade platform.

* * * * *